United States Patent [19]

Kimura et al.

[11] Patent Number: 4,871,913
[45] Date of Patent: * Oct. 3, 1989

[54] SIGNAL PROCESSING METHOD IN AUTORADIOGRAPHY

[75] Inventors: Tsutomu Kimura; Kazuhiro Hishinuma; Misashi Shiraishi, all of Kanagawa, Japan

[73] Assignee: Fuji Photo Film Co., Ltd., Kanagawa, Japan

[*] Notice: The portion of the term of this patent subsequent to May 12, 2004 has been disclaimed.

[21] Appl. No.: 161,248
[22] Filed: Feb. 19, 1988

[30] Foreign Application Priority Data

May 4, 1984 [JP] Japan .................................. 59-89615
Jul. 6, 1984 [JP] Japan .................................. 59-140908

[51] Int. Cl.4 ............................ G21H 5/02; G01T 1/20
[52] U.S. Cl. .................................. 250/327.5; 250/303
[58] Field of Search .................. 250/327.2, 484.1, 303; 364/414, 413.26

[56] References Cited

U.S. PATENT DOCUMENTS 4,665,312 4/1987 Shiraishi et al. .................... 250/303

FOREIGN PATENT DOCUMENTS 3116204 1/1982 Fed. Rep. of Germany ...... 364/414
0083057 5/1984 Japan ................................. 250/327.2

Primary Examiner—Janice A. Howell
Assistant Examiner—Richard Hanig
Attorney, Agent, or Firm—Gerald J. Ferguson, Jr.

[57] ABSTRACT

A signal processing method in autoradiography for determining base sequence of DNA or DNA fragment, employing groups of base-specific synthetic products which are complementary to the DNA or DNA fragment and a labeled with a radioactive element, said groups being resolved one-dimensionally in parallel relation to each other to form resolved rows on a support medium, which comprises a process including:
(1) determining on each of the resolved rows a scanning line for signal processing;
(2) detecting on each of the resolved rows sampling points on said scanning line; and
(3) comparing and identifying the positions of said sampling points on the scanning lines among the resolved rows to obtain locational information on guanine, ademine, thymine and cytosine;

said process being applied to digital signals corresponding to an autoradiograph having the locational information on the radioactively labeled synthetic products, said digital signals being obtained by the use of a stimulable phosphor sheet or by the use of a radiosensitive material.

9 Claims, 4 Drawing Sheets

SIGNAL PROCESSING METHOD IN AUTORADIOGRAPHY

This application is a continuation of Ser. No. 730,034, filed 5/3/85, now abandoned.

BACKGROUND OF THE INVENTION

1. Field of the Invention

This invention relates to a signal processing method in autoradiography for determining base sequence of DNA or DNA fragment.

2. Description of the Prior Arts

Autoradiography has been known as a method for obtaining locational information on radioactively labeled substances distributed in at least one-dimensional direction to form distributed rows on a support medium.

For instance, the autoradiography comprises steps of: labeling organism-originating biopolymers such as proteins or nucleic acids with a radioactive element; resolving the radioactively labeled biopolymers, derivatives thereof, cleavage products thereof or synthetic products thereof on a gel support (support medium) through a resolving process such as gel electrophoresis; placing the gel support and a high-speed X-ray film together in layers for a certain period of time to expose said film, developing said film; obtaining the locational information on the radioactively labeled substances from the developed film; and then performing the identification of the polymeric substances, determination of molecular weight thereof and isolation thereof based on the obtained locational information.

Recently, the autoradiography has been effectively used especially for determining the base sequence of a nucleic acid such as DNA (or DNA fragment, hereinafter "DNA" may be used to include both DNA and DNA fragment). The autoradiograhy is considered to be of a value for the structural determination of polymeric substances originating from organisms.

Sanger-Coulson method is known as a representative method for determining the base sequence of DNA. In this method, the base sequence of DNA is determined by ingeniously utilizing synthesis of DNA fragments with DNA synthesis enzyme, gel electrophoresis and autoradiography on the basis of such characteristic structure that DNA has a double helix structure consisting of two chain molecules, whose constitutional unit contains any one of four bases: adenine (A), guanine (G), cytosine (C) and thymine (T), the two chain molecules are stabilized through hydrogen bonding between these bases, and that the hydrogen bonding between each two constitutional base units comprises only two combinations, namely, G-C and A-T.

In the Sanger-Coulson method, there are a number of known procedures for synthesizing and sequencing DNA fragments complementary to DNA (hereinafter the sequenced fragments being referred to as DNA specimen). Basically, single-stranded DNA is used as template, which is incubated with a DNA synthesis enzyme (DNA polymerase) in the presence of mononucleoside triphosphates containing the above four kinds of bases, thus synthesizing (transcribing) DNA fragments of different but discrete lengths which are complementary to the DNA specimen. When part of the mononucleoside triphosphates are radioactively labeled, there can be obtained base-specifically synthesized DNA fragments (synthetic DNAs) labeled with a radioactive element.

A mixture of the synthetic DNAs is then resolved (developed) on a support medium by electrophoresis, and the support medium is autoradiographed to obtain an autoradiograph of a resolved pattern of the synthetic DNAs. The base sequence can be determined in order, starting from the end of the chain molecule according to the visualized autoradiograph. In this way, the sequence for all bases of the DNA specimen can be determined.

Sanger-Coulson method summarized above is described briefly in the following literature: "Reading the genetic information in the original language. A surprising method for sequencing the bases of DNA" written in Japanese by Kin-ichiro Miura, Modern Chemistry, September 1977, pp. 46–54 (Tokyo Kagaku Dozin Ltd., Japan).

In the autoradiography utilizing the conventional radiography, as described above, the visualization of an autoradiograph on a radiographic film is needed to obtain locational information on radioactively labeled substances. In fact, the investigators have determined the distribution of radioactively labeled substances in a sample by visually observing a visualized autoradiograph to obtain the locational information on the specific substances labeled with a radioactive element.

For instance, the DNA sequencing is visually determined by measuring the resolved positions of base-specific synthetic products labeled with a radioactive element and comparing them with each other. Accordingly, the autoradiography has unfavorable feature that it requires visual analysis, thereby needing a great amount of time and labor.

Further, the locational information obtained by the analysis of the autoradiograph varies depending on the investigators in charge because of inherent unreliability of visual observation, and the accuracy of the information is limited to a certain extent. Particularly, in such a case that only a small quantity of a sample has been employed, that the intensity of radiation energy emitted by the radioactively labeled substances has been low, or that the exposure has been done under unfavorable conditions, an autoradiographic image visualized on a radiographic film has reduced quality (in regard to sharpness, contrast, etc.) so that satisfactory information can not be obtained and the accuracy is low. These are drawbacks of the conventional autoradiography.

In order to improve the accuracy of the locational information, for instance, a visualized autoradiograph can been scanned by means of a device such as a scanning densitometer. However, such scanning process requires increased time and complicated procedures.

In addition to the above-described disadvantages, a sample and radiographic film is required to be placed together in layers for a long period of time to expose the film to radioactive substances contained in the sample so as to visualize the autoradiograph having the locational information on the radiographic film (for instance several days are required). Moreover, the exposure ought to be conducted at a low temperature (0° C. to −90° C.) to avoid appearance of the chemical fog of the photosensitive silver salt in the radiographic film which is caused by various substances contained in the sample. Thus, the exposure ought to be done under specific conditions. Moreover, since the photosensitive silver salt in a radiographic film has a drawback that it is also sensitive to physical impetus, or is apt to be physically fogged, careful and skillful handling is required. This feature further brings about another complexity in the autoradiographic procedure.

The radiographic film is also exposed to certain natural radioactive substances contained in the sample other than the radioactively labeled substances under analysis during the exposure for a long period of time. Accordingly, this exposure also lowers the quality of the obtained image, in addition to the chemical and physical fogs do.

SUMMARY OF THE INVENTION

The present inventors have found that the base sequence of DNA or DNA fragment is easily determined by subjecting digital signals which corredspond to an autoradiograph having locational information on the radioactively labeled substances to an appropriate signal processing. Said digital signals can be obtained without necessity of visualization thereof by utilizing a radiation image recording and reproducing method using a stimulable phosphor sheet. Further, the visualization of the autoradiograph based on the obtained electric signals or digital signals can be attached to the signal processing.

The present invention provides a signal processing method in autoradiography for determining base sequence of DNA or DNA fragment, employing at least four groups of base-specific synthetic products which are complementary to the DNA or DNA fragment and labeled with a radioactive element, said at least four groups comprising:

(1) base-specific synthetic products including at least guanine-specific synthetic products;

(2) base-specific synthetic products including at least adenine-specific synthetic products;

(3) base-specific synthetic products including at least thymine-specific synthetic products; and (4) base-speeific synthetic products including at least cytosine-specific synthetic products;

and being resolved one-dimensionally in parallel relation to each other to form resolved rows on a support medium, which comprises a process including:

(1) determining on each of the resolved rows a scanning line for signal processing;

(2) detecting on each of the resolved rows sampling points on said scanning line; and (3) comparing and identifying the positions of said sampling points on the scanning lines among the resolved rows to obtain locational information on guanine, adenine, thymine and cytosine;

said process being applied to digital signals corresponding to an autoradiograph having the locational information on the radioactively labeled synthetic products, said digital signals being obtained by causing a stimulable phosphor sheet to absorb radiation energy emitted by the radioactively labeled synthetic products in the support medium to record the autoradiograph of the radioactively labeled synthetic products on the phosphor sheet, irradiating said phosphor sheet with an electromagnetic wave to release at least a portion of the radiation energy stored in the phosphor sheet as stimulated emission, and detecting the stimulated emission photoelectrically.

A visible image can be further obtained by attaching to the signal processing method an additional process for reproducing the visible image from electric signals or digital singals corresponding to said autoradiograph obtained by detecting the stimulated emission photoelectrically.

The digital signals corresponding to the autoradiograph can be also obtained by reading out an autoradiograph visualized on a radiosensitive material according to the conventional radiography.

Accordingly, the present invention also provides a signal processing method in autoradiography for determining base sequence of DNA or DNA fragment, employing the above-mentioned radioactively labeled synthetic products which are complementary to the DNA or DNA fragment and resolved one-dimensionally in parallel relation to each other to form resolved rows on a support medium, which comprises a process including:

(1) determining on each of the resolved rows a scanning line for signal processing;

(2) detecting on each of the resolved rows sampling points on said scanning line; and (3) comparing and identifying the positions of said sampling points on the scanning lines among the resolved rows to obtain locational information on guanine, adenine, thymine and cytosine;

said process being applied to digital signals corresponding to an autoradiograph having the locational information on the radioactively labeled synthetic products, said digital signals being obtained by exposing a radiosensitive material to radiation emitted by the radioactively labeled synthetic products in the support medium to record the autoradiograph of the radioactively labeled synthetic products on the radiosensitive material, and reading out the autoradiograph photoelectrically.

In the invention, the term "locational information" on the radioactively labeled substances resolved on the support medium means to include a variety of information relating to the location of the radioactively labeled substances or the aggregation thereof, being present in the support medium, such as the location, the shape, the concentration, the distribution and combination thereof.

DETAILED DESCRIPTION OF THE INVENTION

Figure 1:
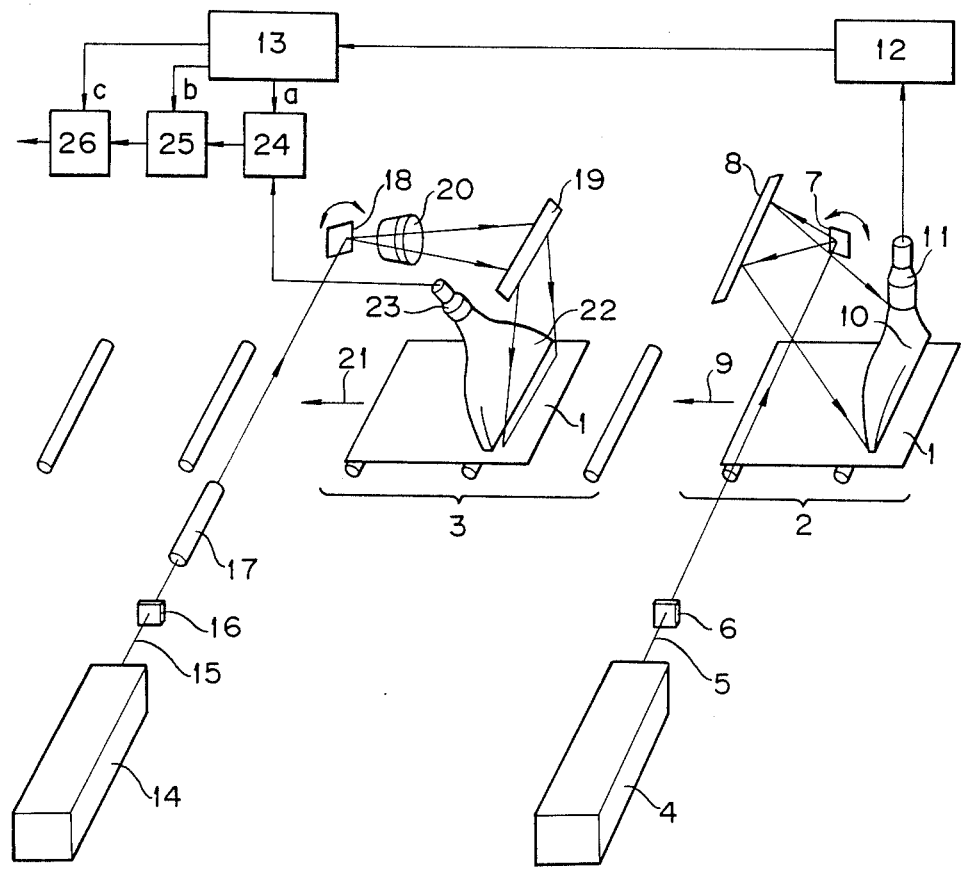
FIG. 1 shows an embodiment of the read-out system for reading out an autoradiograph stored and recorded on a stimulable phosphor sheet, employable in the present invention.

In the present invention, the digital signal having the locational information on the radioactively labeled substances, which is obtained by the radiation image recording and reproducing method using a stimulable phosphor sheet or by reading out the visible image on a radiosensitive material given by the conventional radiography, is processed in an appropriate signal processing circuit having a function of signal processing to give automatically information on the base sequence of DNA or DNA fragment. This method requires no visual observation.

Accordingly, the analysis of the autoradiograph can be automated by applying thereto the present invention comprising subjecting the digital signals corresponding to the autoradiograph having the locational information on the radioactively labeled substances to the digital signal processing, so that the time and labor required in the conventional method is reduced. Further, the locational information is obtained with high accuracy by the present invention.

The digital signals corresponding to the autoradiograph of a sample are obtained by photoelectrically reading out the autoradiograph visualized on the radiosensitive material. Particularly, the digital signals, which are hardly affected even if the level of density of the image on the radiosensitive material deviates depending upon variation of the exposure conditions brought about by variation of the conditions of the sample and fluctuation of the speed of the radiographic emulsion (photographic emulsion), can be obtained by setting the read-out gain at an appropriate value in the step of the read-out.

Alternatively, the digital signals are directly obtained without such visualization of the autoradiograph as in the conventional radiography by utilizing the radiation image recording and reproducing method.

The radiation image recording and reproducing method which is employable in place of the conventional radiography is described, for instance, in U.S. Pat. No. 4,239,968, and said method comprises steps of: causing a stimulable phosphor in a stimulable phosphor sheet to absorb radiation energy having passed through an object or having radiated from an object; exciting the stimulable phosphor with an electromagnetic wave such as visible light or infrared rays (hereinafter referred to as "stimulating rays") to sequentially release the radiation energy stored in the stimulable phosphor as light emission; photoelectrically detecting the emitted light to give electric signals, or further converting the electric signals to digital signals through A/D conversion or reproducing a visible image on a recording material from the electric signals.

The stimulable phosphor sheet contains a stimulable phosphor such as a divalent europium activated alkaline earth metal fluorohalide phosphor. When exposed to a radiation such X-rays, α-rays, β-rays, γ-rays, or ultraviolet rays, the stimulable phosphor absorbs a portion of the radiation energy and then emits light (stimulated emission) corresponding to the radiation energy stored therein upon excitation with an electromagnetic wave (stimulating rays) such as visible light or infrared rays.

The radiation image recording and reproducing method has such a practical advantage that a radiation image can be recorded over a wide range of radiation exposure in comparison with the conventional radiography. More in detail, it is known that the amount of stimulated emission given by the stimulable phosphor upon excitation with stimulating rays after storing radiation energy is proportional to the amount of the radiation exposure over a wide range thereof. For this reason, the digital signal accurately corresponding to the autoradiograph of an object can be directly obtained by this method.

In the step of photoelectrically detecting the stimulated emission, digital signals which are hardly affected even if the level of radiation energy stored in the stimulable phosphor sheet deviates depending upon variation of the exposure conditions brought about by variation of the conditions of the object, fluctuation of the sensitivity of the phosphor sheet, and fluctuation of the sensitivity of a photosensor, can be obtained by setting the read-out gain at an appropriate value. The method can be also performed with less amount of radiation from the sample than the conventional radiography, and the radioactively labeled substances in the sample which are harmful to investigators can be reduced.

Further advantageous feature of the invention is that the autoradiograph having the locational information on the radioactively labeled substances can be obtained in the form of a visible image in addition to the locational information in the form of symbols and/or numerals. Thus, the locational information obtained in the form of the symbols and/or numerals through signal processing can be compared or checked with the visible image. Otherwise, the obtained image can be also compared with another visualized autoradiograph. Since the conventional radiography has been heretofore employed, the visualization of the autoradiograph is very useful for comparison and identification with other visible images obtained in the conventional autoradiography. This also makes possible to keep the locational information in the form of an image, in addition to storage of the information in the form of symbols and/or numerals in a magnetic tape or the like.

A suitable image processing can be also performed on the digital signals to obtain a well readable visible image, because the visualization of an autoradiograph of a sample is done for the electric signals and/or digital signals corresponding thereto. Furthermore, this method provides an advantage that the exposure of a stimulable phosphor sheet to a sample can be conducted under remarkably milder exposure conditions (period of time, temperature, etc.) than that required in the conventional radiography. That is, the exposure of the phosphor sheet can be done at an ambient temperature or in the vicinity thereof without decreasing the accuracy of the locational information, and the exposure time is noticeably shortened because of the high sensitivity of the phosphr sheet. This also brings about the improvement in the accuracy of autoradiography and the simplification of procedure thereof.

Examples of the sample employable in the present invention include a support medium on which base-specific synthetic products and/or mixture thereof, which are synthesized using radioactively labeled deoxynucleoside triphosphates (dNTP) and a DNA synthesis enzyme in the presence of DNA or DNA fragment as template, are resolved (or developed) in one-dimensional direction to form resolved rows.

Especially, in the case that the base-specific synthetic products are synthesized by a dideoxy sequencing method (sometimes called chain termination sequencing method) using dideoxynucleoside triphosphates (ddNTP) having a function of terminating the synthesis reaction of DNA, which is extensively used among Sanger-Coulson methods, the following simplest combination can be obtained:

(1) guanine-specific synthetic products, (2) adenine-specific synthetic products,
(3) thymine-specific synthetic products, and
(4) cytosine-specific synthetic products.

Examples of the method for resolving (or developing) the radioactively labeled substances on a support medium include electrophoresis using one of various support mediums such as agarose gel, polyacrylamide gel, etc.; thin layer chromatography using silica gel, etc.; and paper chromatography using filter paper, etc. Among these method, the electrophoresis using a gel support medium is a representative one and preferably employed in the invention.

The digital signals corresponding to an autoradiograph of the sample can be preferably obtained by using the stimulable phosphor sheet according to the radiation image recording and reproducing method.

The stimulable phosphor sheet used in the present invention has a basic structure comprising a support, a phosphor layer and a transparent protective film. The phosphor layer comprises a binder and a stimulable phosphor dispersed therein, and for instance, it is obtained by dispersing particulate divalent europium activated barium fluorohalide (BaFBr:Eu$^{2+}$) phosphor in a mixture of nitrocellulose and linear polyester. The stimulable phosphor sheet is, for example, prepared by providing the phosphor layer onto the support such as a polyethylene terephthalate sheet and then providing a protective film such as a polyethylene terephthalate sheet on the phosphor layer.

In carrying out the exposing procedure, that is, the procedure of storing and recording the radiation energy released by the support medium containing the radioactively labeled substances on the stimulable phosphor sheet, at least a portion of the released radiation energy is absorbed by the phosphor sheet by placing the support medium and phosphor sheet together in layers for a certain period of time. The exposure can be accomplished by keeping the phosphor sheet in a position adjacent to the support medium, for instance, at a room temperature or lower temperature for at least several seconds.

Detailed description on the preparation of the sample in the autoradiography using the Sanger-Coulson method, the stimulable phosphor sheet and the exposing procedure employable in the invention is given in Japanese Patent Application No. 58(1983)-201231 (corresponding to U.S. patent application Ser. No. 664,405 now abandoned or European Patent Application No. 84112879.6).

A method for reading out the information on one-dimensional location on the radioactively labeled substances in the sample stored and recorded on the stimulable phosphor sheet according to the invention will be described briefly, referring to an embodiment of a read-out system shown in FIG. 1 of the accompanying drawings.

FIG. 1 schematically illustrates an embodiment of the read-out system comprising a preliminary read-out section 2 for preliminarily reading out the information on the one-dimensional location of the radioactively labeled substances stored and recorded on the stimulable phosphor sheet 1 (from which the sample generally has been removed; the stimulable phosphor sheet is hereinafter referred to as "phosphor sheet"), and a final read-out section 3 for finally reading out the information stored and recorded on the phosphor sheet 1.

In the preliminary read-out section 2, the preliminary read-out operation is carried out in the following manner.

Laser beam 5 generated by a laser source 4 first passes through a filter 6 to cut off a light beam in the wavelength region corresponding to the wavelength region of stimulated emission to be emitted from the phosphor sheet 1 in response to stimulation with the laser beam 5. The laser beam 5 is subsequently deflected by a beam deflecter 7 such as a galvanometer mirror, and reflected by a plane reflecting mirror 8. The deflected beam then impinges upon the phosphor sheet 1. The laser source 4 used herein is so selected as to avoid overlapping of the wavelength region of the laser beam 5 with the main wavelength region of the stimulated emission to be emitted from the phosphor sheet 1.

The phosphor sheet 1 is transferred to the direction along the arrow 9 under the irradiation of the above-mentioned deflected laser beam. Therefore, the whole surface of the phosphor sheet 1 is subjected to the irradiation of the deflected laser beam. The power of the laser beam 5 employed in the preliminary read-out section is adjusted to be lower than the power of the laser beam to be employed in the final read-out section, for example, by controlling the output of the laser source 4, the beam diameter of the laser beam 5, the scanning speed of the laser beam 5 or the transferring speed of the phosphor sheet 1.

When irradiated with the above-mentioned laser beam, the phosphor sheet 1 gives the stimulated emission having the emission intensity proportional to the radiation energy stored (or recorded) therein. The emission then enters into a light guiding sheet 10 for the preliminary read-out. The light guiding sheet 10 has a linear edge face for receiving the emission, and the edge face is so positioned in the vicinity of the phosphor sheet as to correspond to the scanning line on the phosphor sheet 1. The exit of the light guiding sheet 10 is in the form of a ring and is connected to an light-receiving face of a photosensor 11 such as a photomultiplier. The light guiding sheet 10 is made, for instance, by processing a sheet of a transparent thermoplastic resin such as a polyacrylic synthetic resin, and so constituted that the emission introduced from the linear edge face is transmitted to the exit under repeated total reflection within the sheet 10. The stimulated emission from the phosphor sheet 1 is guided in the interior of the light guiding sheet 10 to the exit, and received by the photosensor 11.

On the light-receiving face of the photosensor 11 is provided a filter which allows only the light of wavelength region of the stimulated emission to pass through and cuts off the light of the wavelength region of the stimulating rays (laser beam) so as to detect only the stimulated emission. The stimulated emission detected by the photosensor 11 is converted to electric signals, which are amplified in an amplifier 12 and transmitted to the output. The stored information output from the amplifier 12 is supplied to a control circuit 13 of the final read-out section 3. The control circuit 13 provides an amplification degree setting value a and a scale factor setting value b, for obtaining signals at an appropriate level. In the case of further reproducing the autoradiograph in the form of a visible image, an image processing condition setting value c is set so that a well readable image having uniform concentration and contrast can be given regardless of variation of the detected information.

The phosphor sheet 1 having been subjected to the preliminary read-out in the above-described manner is then transferred to the final read-out section 3.

In the final read-out section 3, the following read-out operation is performed.

The laser beam 15 generated by a laser source 14 for the final read-out passes through a filter 16 having the same function as that of the above-mentioned filter 6, and then the beam diameter is precisely adjusted in a beam expander 17. Subsequently, the laser beam is deflected by a beam deflector 18 such as a galvanometer mirror, and reflected by a plane reflection mirror 19. The deflected beam then impinges one-dimensionally upon the phosphor sheet 1. Between the beam deflector 18 and the plane reflection mirror 19 an f-$\theta$ lens 20 is provided so that the beam speed is continuously kept constant when the deflected laser beam is scanned on the phosphor sheet 1.

The phosphor sheet 1 is transferred in the direction along the arrow 21 under the irradiation with the above-mentioned deflected laser beam. Accordingly, the whole surface of the phosphor sheet is subjected to the irradiation in the same manner as in the preliminary read-out operation.

When irradiated with the above-mentioned laser beam, the phosphor sheet 1 gives the stimulated emission in proportion to the radiation energy stored therein in the same manner as in the preliminary read-out operation. The emission then enters into a light guiding sheet 22 for the final read-out. The light guiding sheet 22 for the final read-out is made of the same material and has the same constitution as the light guiding sheet 10 employed for the preliminary read-out. The stimulated emission received is guided in the interior of the light guiding sheet 22 up to the exit under repeated total reflection, and then received by a photosensor 23. On the light-receiving face of the photosensor 23 is provided a filter which allows only the light of wavelength region of the stimulated emission to pass through and cuts off the light of the wavelength region of the stimulating rays (laser beam) so as to detect only the stimulated emission. The stimulated emission detected by the photosensor 23 is converted to electric signals, which are amplified to electric signals adjusted to an appropriate level in an amplifier 24 according to the aforementioned amplification degree setting value a and transmitted to an A/D converter 25. The adjusted electric signals are then converted to digital signals in the A/D converter 25 according to an appropriate scale factor defined by the scale factor setting value b.

In the above description on the method for reading out the locational information on the radioactively labeled substances stored and recorded on the stimulable phosphor sheet, a read-out operation involving both the preliminary read-out operation and the final read-out operation has been given. However, the read-out operation employable in the present invention is not limited to the above-described embodiment. For instance, the preliminary read-out operation may be omitted if the content of the radioactive substances in the sample and an adequate exposure time for the sample is previously known.

Further, other suitable methods than the above-mentioned embodiments may be used for reading out the locational information on the radioactively labeled substances on the support medium, which is stored and recorded on the stimulable phosphor sheet.

Thus obtained digital signals corresponding to the autoradiograph of the radioactively labeled substances are subsequently input into a signal processing circuit 26 shown in FIG. 1. In the signal processing circuit 26, the digital signals are processed to give locational information on the radioactively labeled substances in the form of symbols and/or numerals. More in detail, a scanning line for the signal processing is determined and then sampling points along the scanning line are detected in the circuit 26. If desired, the signals can be further processed to visualize the autoradiograph according to the image processing condition setting value c.

Alternatively, the digital signals corresponding to the autoradiograph of a sample can be also obtained from an autoradiographic image on a radiosensitive material which is visualized according to the conventional radiography.

The radiosensitive material used in the present invention has a basic structure comprising a support and a radiographic emulsion (photographic emulsion) layer. The radiographic emulsion layer comprises a binder such as gelatin and silver halide (radiosensitive substance) dispersed therein. For instance, the radiosensitive material is prepared by providing the emulsion layer onto the transparent support such as a polyethylene terephthalate sheet. A representative example of the radiosensitive material includes a radiographic film such as a high-speed type X-ray film.

In carrying out the exposing procedure, that is, the procedure of exposing the radiosensitive material to a radiation emitted by the support medium containing the radioactively labeled substances, at least a portion of the emitted radiation is absorbed by the radiosensitive substance in the radiosensitive material by placing the support medium and radiosensitive material together in layers for a certain period of time. The exposure can be accomplished by keeping the radiosensitive material in a position adjacent to the support medium, for instance, at a low temperature such as a temperature lower than 0° C. for at least several days, and then the radiosensitive material is developed. In the exposing procedure, it is further possible to enhance the radiographic speed of the radiosensitive material by using a radiographic intensifying screen or applying thereto a preliminary exposure such as flash exposure.

The exposing procedure of the radiosensitive material to a sample and the developing procedure thereof in the autoradiographic process have been well known, and are described for instance in the following literature: Method in Biochemical Experiment, Volume 6, Method in Tracer Experiment I, 271-289, "8. Autoradiography" by Toru Sueyoshi & Akiyo Shigematsu (Tokyo Kagaku Dozin Ltd., 1977).

A method for reading out the autoradiographic image having information on the one-dimensional location of the radioactively labeled substances, recorded on the radiosensitive material according to the invention will be described briefly, referring to an embodiment of a read-out system shown in FIG. 2 of the accompanying drawings.

Figure 2:
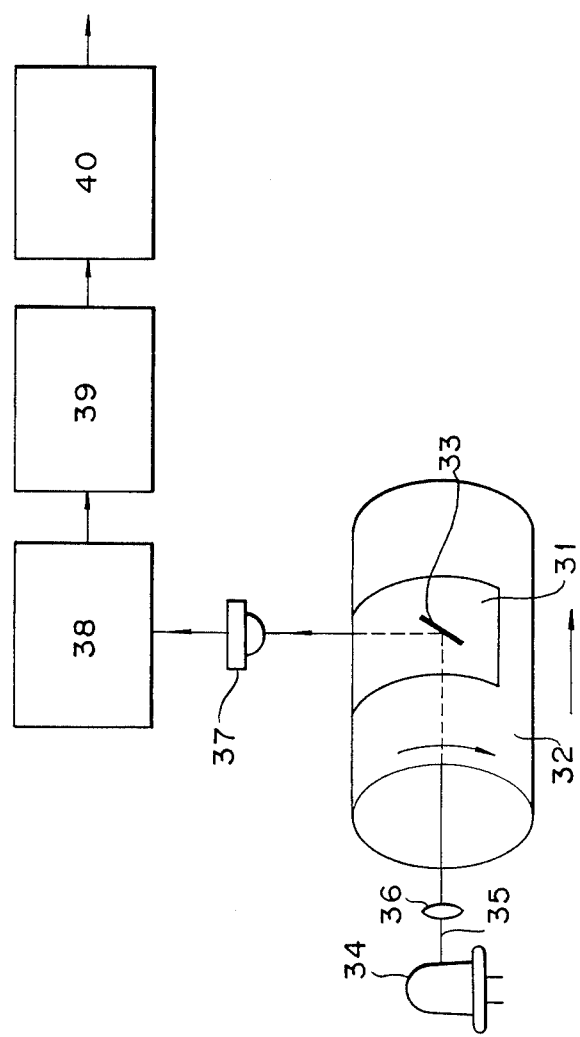
FIG. 2 shows an embodiment of the read-out system for reading out an autoradiographic image recorded on a radiosensitive material, employable in the present invention.

FIG. 2 schematically illustrates an embodiment of the read-out system for reading out the autoradiographic image on a radiosensitive material 31.

The radiosensitive material 31 on which the visual image is recorded is mounted on a transparent and hollow drum 32. The drum 32 is moved in the axial direction at a certain speed as well as rotated about its axis at a certain pitch and a mirror 33 is fixed in the hollow drum 32. A light beam 35 generated by a light source 34 passes through a lens 36 and comes into the drum 32. The light beam is then reflected in the upper direction by the mirror 33 and passes through the radiosensitive material 31 mounted on the transparent drum 32. Thus, the radiosensitive material 31 is spot-scanned with the light beam 35 in the X-Y scanning mode.

The light beam passing through each position of the radiosensitive material 31 is received by a photosensor 37 and converted to electric signals, which are amplified by an amplifier 38 and converted to digital signals through an A/D converter 39.

More in detail, the read-out procedure is described in Japanese Patent Provisional Publications No. 54(1979)-121043.

In the above description on the method for reading out the autoradiographic image recorded on the radiosensitive material, a read-out procedure utilizes the light transmission method using a light beam, but the light reflection method can be also applied thereto. Further, the read-out procedure is by no means restricted to the above-mentioned embodiment, but other various methods such as a read-out procedure using a TV camera can be utilized.

Thus obtained digital signals corresponding to the autoradiograph of the radioactively labeled substances are subsequently input into a signal processing circuit 40 shown in FIG. 2. In the signal processing circuit 40, the digital signals are processed to give locational information on the radioactively labeled substances in the form of symbols and/or numerals. More in detail, a scanning line for the signal processing is determined and then sampling points along the scanning line are detected in the circuit 40.

The signal processing according to the present invention for the determination of base sequence of DNA is described below, utilizing the aforementioned dideoxy terminating method of Sanger-Coulson mehtod and the radiation image recording and reproducing method, and referring to an example employing the following four groups of base-specific synthetic products:

(1) guanine-specific synthetic products,
(2) adenine-specific synthetic products,
(3) thymine-specific synthetic products, and
(4) cytosine-specific synthetic products.

A single-stranded DNA into which DNA specimen is inserted is first prepared. This is called a DNA template. A short-chain DNA fragment (called primer) complementary to part of the DNA template is prepared and hybridized with the DNA template according to the conventional manner. Four kinds of deoxynucleoside triphosphates (dNTP), at least one kind of which is labeled with a radioactive element ($^{32}P$), and a kind of dideoxynucleoside triphosphate (ddNTP) are added to the DNA template having the primer. The primer and template are both incubated together with a DNA polymerase in the presence of the mixture of dNTP and ddNTP to prolong the DNA chain from the primer site of the DNA template, so that the above four groups (1)-(4) of base-specific synthetic products are obtained. For example, guanine-specific synthetic products are synthesized using ddGTP as ddNTP. The other base-specific synthetic products are also synthesized using the corresponding ddNTP (ddATP, ddTTP or ddCTP).

The four groups of base-specific synthetic products are then resolved on a gel support medium through electrophoresis to obtain a developed sample. Then, the sample (support medium) is placed on a stimulable phosphor sheet together in layers at room temperature for several minutes to perform the exposure, and an autoradiograph of the electrophoretic pattern (comprising four electrophoretic rows) in the sample is stored and recorded on the phosphor sheet.

Figure 3:
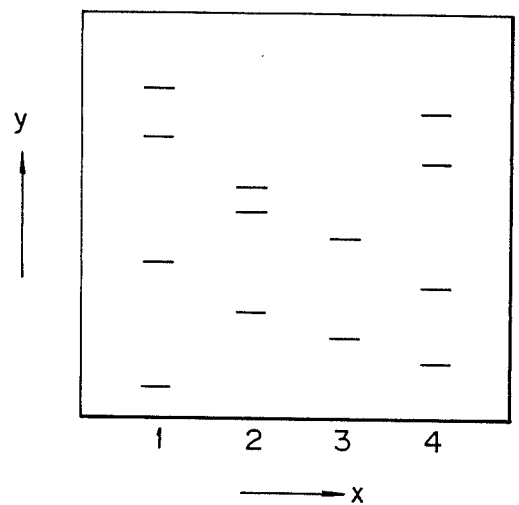
FIG. 3 shows an example of an autoradiograph of a sample comprising base-specific synthetic products resolved on a gel support medium.

FIG. 3 schematically shows an autoradiograph of electrophretic pattern consisting of the four groups of radioactively labeled synthetic products. That is, rows of from the first to fourth shown in FIG. 3 in order correspond to:

(1) (G)-specific synthetic products,
(2) (A)-specific synthetic products,
(3) (T)-specific synthetic products, and
(4) (C)-specific synthetic products.

The stimulable phosphor sheet on which the autoradiograph is stored and recorded, then is installed on the read-out system shown in FIG. 1 to carry out the read-out operation, and the digital signals corresponding to the autoradiograph shown in FIG. 3 are obtained. The digital signals received by the signal processing circuit 26 shown in FIG. 1 are provided with an address (X, Y) which is represented by a coordinate system defined by the phosphor sheet and with a signal level (Z) in each address corresponding to the intensity of stimulated emission. That is, the digital image data having the locational information on the above-mentioned radioactively labeled substances are given to the signal processing circuit 26. In the present invention, the term "digital image data" means a set of digital signals corresponding to the autoradiograph of the radioactively labeled substances.

In the first step for the processing, a scanning line for the digital signal processing is determined with respect to the digital signals. In FIG. 3, the scanning line can be determined, for instance, by the following manner in which the vertical direction (namely, electrophoretic direction) is referred to as a Y-axis direction and the horizontal direction as an X-axis direction: the digital image data obtained as above are scanned numerically along the X-axis direction and X coordinate ($X_a$) at which the signal exhibits a maximum level is detected, wherein a is a positive integer and represents the number of each row. The scanning along the X-axis direction can be done at any position along the Y-axis (for instance, at $Y=Y_a$), but the scanning is necessarily done in such a sufficient width as to cover at least one resolved portion (namely, electrophoretic band) of the radioactively labeled substances. When the scanning width is such a width as to cover only one band, one maximum level is generally detected and corresponds to any one X coordinate of the four electrophoretic rows. Subsequently, such scanning at a different position of Y is repeated at least four times to obtain X coordinates for the four rows.

In the signal processing method of the invention, the digital signals obtained by reading out the stimulable phosphor sheet are stored temporarily in a memory device of the signal processing circuit 26 (that is, stored in a non-volatile memory unit such as a buffer memory, a magnetic disk, etc.). In the signal processing, the scanning on the digital image data means to selectively pick up only the signals in the scanning area from the memory device.

Therefore, the X coordinate ($X_a$) can be detected, for instance, by repeatedly picking up digital signals within the above scanning area along the Y-axis, summing the levels of the picked digital signals for all X coordinates, and locating the position at which the sum of the signal levels is the highest. Alternatively, the X coordinate ($X_a$) can be detected by repeatedly picking up digital signals within the above scanning area along the X-axis, detecting an X coordinate at which the signal level is the highest for every Y coordinate, and determining the X coordinate through calculation of the average coordinate for all X coordinates. In order to remove noise peaks which are possibly picked up in the scanning in addition to the desired signals, the signal level may be made two-valued with a previously set threshold value.

The straight line which passes through the detected X coordinate ($X_a$) and is parallel to the Y-axis is assigned to the scanning line for the signal processing procedure described below.

In the second step, sampling points on the scanning line are detected. All points at which the signal exhibits a maximum level detected in the course of picking up digital signals on the scanning line can be assigned to the sampling points for detecting electrophoretic bands of the radioactively labeled substances. This scanning procedure along the scanning line is also desirably done with a certain width. Thus, the term "maximum points of the signal level" means all the peak points given in a graph in which the position (Y) is plotted as abscissa (horizontal axis) and the mean value (Z) of the signal levels within the scanning width is plotted as ordinate (vertical axis). Hereinafter, the mean value of the signal levels at each position (in each width) on the scanning line is simply referred to as the signal level at the position.

Figure 4:
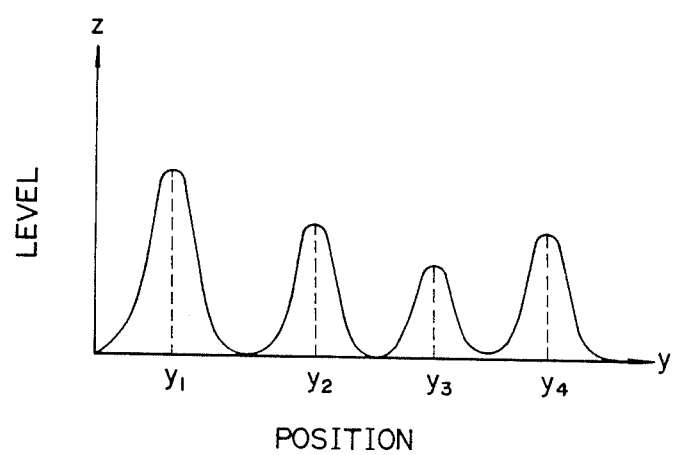
FIG. 4 graphically shows a typical relationship between level of digital signal and position on a scanning line for signal processing.

FIG. 4 shows a graph in which the position (Y) on the scanning line is given on abscissa and the signal level is given on ordinate.

Thus, a sampling point $S_{an}$ having a coordinate and a signal level at its coordinate ($X_a$, $Y_{an}$, $Z_{an}$) is determined, wherein n is a positive integer and represents the number of each sampling point.

The information on one-dimensional location of the radioactively labeled substances can be represented by a combination of the position in the one-dimensional direction and the signal level at its position ($Y_{an}$, $Z_{an}$). The signal level ($Z_{an}$) at each position is assumed to indicate the relative amount (concentration) of the radioactively labeled substances.

Further, if the starting position for electrophoresing the radioactively labeled substances is recorded previously on the stimulable phosphor sheet with a maker containing a radioactive element, the starting position ($Y_0$) can be detected on the digital image data in the same manner as described above. Otherwise, the starting position ($Y_0$) can be detected by beforehand providing the phosphor sheet itself with a mechanical identification means, such as, by punching the sheet to provide a perforation thereon, and superposing the starting position on the support medium on the perforation on the phosphor sheet in the initial stage of the exposing procedure. The locational information can be represented by a combination of the migration distance ($Y_{an}'$) from the starting position of the electrophoresis which is given by calculation according to the subtraction equation $[Y_{an} - Y_0 = Y_{an}']$ and the signal level at its position, namely ($Y_{an}'$, $Z_{an}$).

The relative amount of the radioactively labeled substances can be determined from, for instance, the integrated value in the vicinity of the maximum point or differently calculated values as well as from the signal level at the above-mentioned sampling point.

In the third step, the detected sampling points for the four rows are compared with each other with respect to the position ($Y_{an}$) to arrange the sampling points in the order of from the farthest position to the starting position. For instance, the following scheme is obtained:

$S_{11}, S_{41}, S_{31}, S_{21}, S_{42}, S_{12}, S_{32}, S_{22}, S_{23}, \ldots$ Replacing $S_{an}$ in the scheme according to $S_{1n} = G$, $S_{2n} = A$, $S_{3n} = T$, and $S_{4n} = C$, the following scheme is obtained:

G - C - T - A - C - G - T - A - A - . . .

Figure 5:
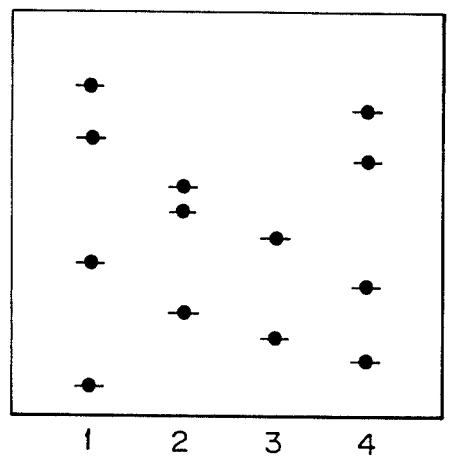
FIG. 5 shows an example of schematic figure showing the base sequence of DNA determined by the signal processing in accordance with the present invention.

Therefore, the base sequence of one chain molecule of DNA complementary to the DNA specimen can be determined. The representation mode of the obtained information on the DNA sequencing is by no means limited to the above-mentioned mode, and any other representation mode may be used optionally. For instance, the signal level ($Z_{an}$) at the sampling point obtained through the signal processing can be represented as the relative amount of each synthetic DNA resolved. Otherwise, the illustrative representation as shown in FIG. 5 is also possible.

Furthermore, the base sequence of two chain molecules of DNA can be represented in combination. That is, by giving the information on the combination between the four bases, namely A-T and G-C, the base sequence of DNA represented by the following scheme is obtained:

G - C - T - A - C - G - T - A - A - . . .

C - G - A - T - G - C - A - T - T - . . .

Thus obtained symbols and/or numerals are transmitted to a recording device (not shown), directly or optionally via storage in a storing means such as a magnetic tape.

Various recording devices based on various systems can be employed for the above described purpose, for instance, a device for visualizing optically by scanning a photosensitive material with laser beam, etc., a display means for visualizing electrically on CRT, etc., a means for printing a radiation image displayed on CRT by means of video printer, and a means for visualizing on heat-sensitive recording material using thermic rays.

The autoradiograph of the radioactively labeled substances on the support medium, if desired, can be further visualized in the form of an image from the obtained digital signals or the electric signals obtained before A/D converting. The signal processing (image processing) in the signal processing circuit 26 may be performed according to the image processing condition setting value c so as to give a well readable visible image having well adjusted concentration and contrast. Examples of the image processing include spatial frequency processing, gradation processing, addition averaging processing, reduction processing and enlarging processing.

The digital signals having been subjected to the image processing are transmitted to a reproducing device, optionally via storage in a storing means such as a magnetic tape.

A procedure for reproducing (recording) an image from the image-processed digital signals having the locational information on the radioactively labeled substances will be described below briefly, referring to a block diagram of a reproducing system shown in FIG. 6.

Figure 6:
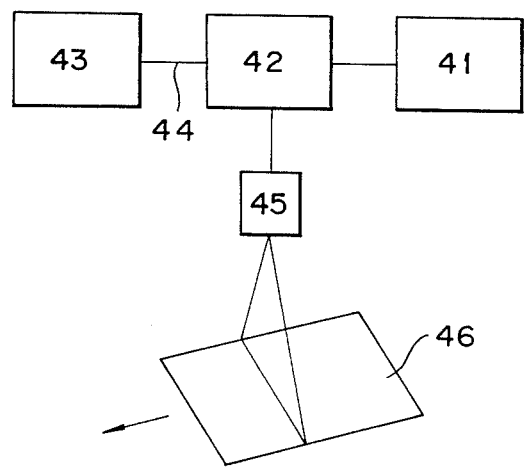
FIG. 6 shows an embodiment of reproducing system for visualizing digital signals corresponding to an autoradiograph stored and recorded on a stimulable phosphor sheet, employable in the present invention.

FIG. 6 is a block diagram showing the outline of the reproduction system for reproducing an image from the digital signals output from the read-out system shown in FIG. 1.

The reproducing procedure is conducted to obtain the locational information on the radioactively labeled substances in the form of an image in the following manner: The signals are input to the D/A converter 41 to be converted to the analogue signals representing the density. The analogue signals are then input to a light modulator 42 and the light modulator 42 is modulated according to the analogue signals. The laser beam 44 generated by a laser source 43 for recording is modulated in the light modulator 42, and subsequently is forced to scan on a photosensitive material 46 such as a photographic film by means of a scanning mirror 45, so that an image is reproduced on the photosensitive material 46.

The procedure for reproducing an image from the digital signals is by no means limited to the above-mentioned procedure, and for instance, a procedure using the aforementioned recording devices may be utilized.

Otherwise, the visual image of the autoradiograph can be also obtained by reproduction from the electric signals which are not A/D-converted to the digital signals. That is, the visual image can be obtained by directly transmitting the electric signals obtained in the amplifier 24 of the read-out system shown in FIG. 1 to the light modulator 42 of the reproducing system shown in FIG. 6.

The method for determining the base sequence of DNA utilizing the above-mentioned combination (G, A, T, C) is an example of the determination of the base sequence of DNA. The signal processing of the present invention is by no means limited to such combination, and various combinations are employable and the base sequence of DNA can be determined by applying thereto the corresponding method in the same manner as described above. For instance, the set or combination obtained by the "plus and minus" method which is another one of Sanger-Coulson methods can be employed to determine the base sequence of DNA. Otherwise, the combination of at least one group of base-specific synthetic products and a suitable reference substance (for example, a mixture of all base-specific synthetic products) can be compared to determine the sequence of the specific base.

In the above-mentioned example the present invention was described by using four rows of the radioactively labeled substances resolved one-dimensionally on a support medium, but the number of resolved rows is by no means limited to four, and may be more or less. Further, the base sequence of two or more of DNAs can be determined simultaneously using one support medium.

It is further possible to perform the processing for genetic philological information such as comparison processing between the obtained DNA sequencing and the base sequence of another DNA which has been already determined and recorded.

We claim:

1. A signal processing method in autoradiography for determining base sequence of DNA or DNA fragment, employing at least four groups of base-specific synthetic products which are complementary to the DNA or DNA fragment and labeled with a radioactive element, said at least four groups comprising:
   (1) base-specific synthetic products including at least guanine-specific synthetic products;
   (2) base-specific synthetic products including at least adenine-specific synthetic products;
   (3) base-specific synthetic products including at least thymine-specific synthetic products; and
   (4) base-specific synthetic products including at least cytosine-specific synthetic products;
   and being resolved one-dimensionally in parallel relation to each other to form resolved rows on a support medium,
   which comprises a process including:
   (1) determining on each of the resolved rows a scanning line for signal processing;
   (2) detecting on each of the resolved rows sampling points on said scanning line; and
   (3) comparing and identifying the positions of said sampling points on the scanning lines among the resolved rows to obtain locational information on guanine, adenine, thymine and cytosine;
   said process being applied to digital signals corresponding to an autoradiograph having the locational information on the radioactively labeled synthetic products, said digital signals being obtained by causing a stimulable phosphor sheet to absorb radiation energy emitted by the radioactively labeled synthetic products in the support medium to record the autoradiograph of the radioactively labeled synthetic products on the phosphor sheet, irradiating said phosphor sheet with an electromagnetic wave to release at least a portion of the radiation energy stored in the phosphor sheet as stimulated emission, and detecting the stimulated emission photoelectrically.

2. The signal processing method in autoradiography as claimed in claim 1, in which said base-specific synthetic products complementary to the DNA or DNA fragment include at least four groups consisting of:
   (1) guanine-specific synthetic products;
   (2) adenine-specific synthetic products;
   (3) thymine-specific synthetic products; and
   (4) cytosine-specific synthetic products.

3. The signal processing method in autoradiography as claimed in claim 1, in which all points on said scanning lines at which the signal exhibits a maximum level are assigned to sampling points in the step (2).

4. A signal processing method in autoradiography for determining base sequence of DNA or DNA fragment, employing at least four groups of base-specific synthetic products which are complementary to the DNA or DNA fragment and labeled with a radioactive element, said at least four groups comprising:
   (1) base-specific synthetic products including at least guanine-specific synthetic products;
   (2) base-specific synthetic products including at least adenine-specific synthetic products;
   (3) base-specific synthetic products including at least thymine-specific synthetic products; and
   (4) base-specific synthetic products including at least cytosine-specific synthetic products;
   and being resolved one-dimensionally in parallel relation to each other to form resolved rows on a support medium,
   which comprises:
   (I) processes including:

(1) determining on each of the resolved rows a scanning line for signal processing;
(2) detecting on each of the resolved rows sampling points on said scanning line; and
(3) comparing and identifying the positions of said sampling points on the scanning lines among the resolved rows to obtain locational information on guanine, adenine, thymine and cytosine;

said process being applied to digital signals corresponding to an autoradiograph having the locational information on the radioactively labeled synthetic products, said digital signals being obtained by causing a stimulable phosphor sheet to absorb radiation energy emitted by the radioactively labeled synthetic products in the support medium to record the autoradiograph of the radioactively labeled synthetic products on the phosphor sheet, irradiating said phosphor sheet with an electromagnetic wave to release at least a portion of the radiation energy stored in the phosphor sheet as stimulated emission, and detecting the stimulated emission photoelectrically, and (II) a process for reproducing the visible image from the electric signals or digital signals corresponding to said autoradiograph obtained by detecting the stimulated emission photoelectrically.

5. The signal processing method in autoradiography as claimed in claim 4, in which said base-specific synthetic products complementary to the DNA or DNA fragment include at least four groups consisting of:
(1) guanine-specific synthetic products;
(2) adenine-specific synthetic products;
(3) thymine-specific synthetic products; and
(4) cytosine-specific synthetic products.

6. The signal processing method in autoradiography as claimed in claim 4, in which all points on said scanning lines at which the signal exhibits a maximum level are assigned to sampling points in the step (2).

7. A signal processing method in autoradiography for determining base sequence of DNA or DNA fragment, employing at least four groups of base-specific synthetic products which are complementary to the DNA or DNA fragment and labeled with a radioactive element, said at least four groups comprising:
(1) base-specific synthetic products including at least guanine-specific synthetic products;
(2) base-specific synthetic products including at least adenine-specific synthetic products;
(3) base-specific synthetic products including at least thymine-specific synthetic products; and
(4) base-specific synthetic products including at least cytosine-specific synthetic products;

and being resolved one-dimensionally in parallel relation to each other to form resolved rows on a support medium, which comprises a process including:
(1) determining on each of the resolved rows a scanning line for signal processing;
(2) detecting on each of the resolved rows sampling points on said scanning line; and
(3) comparing and identifying the positions of said sampling points on the scanning lines among the resolved rows to obtain locational information on guanine, adenine, thymine and cytosine;

said process being applied to digital signals corresponding to an autoradiograph having the locational information on the radioactively labeled synthetic products, said digital signals being obtained by exposing a radiosensitive material to radiation emitted by the radioactively labeled synthetic products in the support medium to record the autoradiograph of the radioactively labeled synthetic products on the radiosensitive material, and reading out the autoradiograph photoelectrically.

8. The signal processing method in autoradiography as claimed in claim 7, in which said base-specific synthetic products complementary to the DNA or DNA fragment include at least four groups consisting of:
(1) guanine-specific synthetic products;
(2) adenine-specific synthetic products;
(3) thymine-specific synthetic products; and
(4) cytosine-specific synthetic products.

9. The signal processing method in autoradiography as claimed in claim 7, in which all points on said scanning lines at which the signal exhibits a maximum level are assigned to sampling points in the step (2).

* * * * *